United States Patent
Wack et al.

(10) Patent No.: US 6,688,530 B2
(45) Date of Patent: Feb. 10, 2004

(54) ELECTRONIC MIXED WATER PREPARATION DEVICE AND METHOD FOR PREPARING MIXED WATER

(75) Inventors: Volker Wack, Bruchsal (DE); Heiko Petzold, Waghäusel (DE)

(73) Assignee: (I)nnotech Electronic GmbH, Bruchsal (DE)

( * ) Notice: Subject to any disclaimer, the term of this patent is extended or adjusted under 35 U.S.C. 154(b) by 0 days.

(21) Appl. No.: 10/149,957

(22) PCT Filed: Dec. 13, 2000

(86) PCT No.: PCT/DE00/04680

§ 371 (c)(1),
(2), (4) Date: Jun. 17, 2002

(87) PCT Pub. No.: WO01/44884

PCT Pub. Date: Jun. 21, 2001

(65) Prior Publication Data

US 2002/0179723 A1 Dec. 5, 2002

(30) Foreign Application Priority Data

Dec. 18, 1999 (DE) .......................... 199 61 183

(51) Int. Cl.$^7$ ................................ G05D 23/13
(52) U.S. Cl. ........................ 236/12.12; 4/676
(58) Field of Search .............. 236/12.12, 12.17, 236/12.19; 4/676, 677

(56) References Cited

U.S. PATENT DOCUMENTS

| | | | |
|---|---|---|---|
| 4,611,757 A | * 9/1986 | Saether | 236/12.12 |
| 4,646,964 A | 3/1987 | Parker et al. | 236/49 |
| 4,785,845 A | * 11/1988 | Kochal | 137/341 |
| 4,842,191 A | * 6/1989 | Bergmann | 236/12.12 |
| 4,976,460 A | * 12/1990 | Newcombe et al. | 236/12.12 |
| 5,032,992 A | * 7/1991 | Bergmann | 700/285 |
| 5,588,636 A | 12/1996 | Eichholz et al. | 251/129.04 |
| 5,979,775 A | * 11/1999 | Raya | 236/12.12 |

FOREIGN PATENT DOCUMENTS

| | | |
|---|---|---|
| DE | 35 18 644 | 1/1989 |
| DE | 37 39 676 | 6/1989 |
| DE | 34 14 510 | 3/1990 |
| DE | 38 38 046 | 5/1990 |
| DE | 40 26 110 | 2/1992 |
| DE | 34 25 445 | 5/1993 |
| DE | 44 01 637 | 7/1994 |
| DE | 44 30 805 | 5/1995 |
| DE | 37 18 039 | 12/1998 |
| GB | 2 056 627 | 3/1981 |

* cited by examiner

*Primary Examiner*—William E. Tapolcai
(74) *Attorney, Agent, or Firm*—Collard & Roe, P.C.

(57) ABSTRACT

The invention relates to an electronic mixed water preparation device. Previously such methods could only be implemented in an industrial environment or in combination with additional devices. The inventive mixed water preparation device is a compact flush-mounted unit for electronically controlling mixed water in private households. The compact inventive unit comprises an electronic controller and a step motor which acts upon a mechanical actuator. The preparation of said mixed water can be exclusively carried out in conjunction with a temperature sensor whose measuring values are used to detect throughflow and excess temperature, in addition to actual temperature values.

9 Claims, 5 Drawing Sheets

ELECTRONIC MIXED WATER PREPARATION DEVICE AND METHOD FOR PREPARING MIXED WATER

The invention relates to a mixed water preparation device comprising an operating unit for inputting a nominal value, and an electronic controller unit that is acting via a mechanical adjusting element on a control line for preparing mixed water depending on a temperature sensor for detecting the actual value. The invention, furthermore, relates to a method, in connection with which a nominal value, which can be input and preset via an operating unit, is acting upon a control line by means of a mechanical adjusting element for preparing mixed water via an electronic controller unit depending on an actual value detected with the help of a temperature sensor.

Such an electronic preparation of mixed water is known from DE 40 26 110. This known device is a system for preparing mixed water that comprises cold and hot water inlets, as well as a mixed water drain, and a control valve that is arranged upstream of the mixing chamber. An electronic controller and a digitally operating controller and computer unit are associated with the control valve. The controller and computer unit cooperates with a program memory. The mixed water can be prepared either with the help of the preset values input via an operating unit, or based on the values specified in a control program filed in the program memory.

This development is particularly based on the problem of fitting existing mixed water batteries with an electronic controller at a later time. The drawback of this construction set for equipping an existing system at some later time is that this is an additional external device. This device can be used only in rare cases within the sphere of private applications because the space conditions in the area of bathrooms are confined. Furthermore, such a high-quality mixed water preparation system is associated with optical restrictions on account of an additional device that can be mounted only on plaster, which is usually perceived as being not very attractive, visually speaking. Mounting the additional device on the plaster is mandatory also for the reason that the idea and purpose of the known device is to be able to replace the program memory associated with the control valve when so required. The device necessarily has to be freely accessible for such an exchange.

Therefore, the invention is based on the problem of providing a device and a method for the electronic preparation of mixed water that avoids the drawbacks existing in the prior art and is suitable in the sphere of the private home and household.

The problem on which the invention is based is solved by a device according to claim 1, as well as by a method according to claim 8.

Owing to the fact that according to the independent claim, both the electronic controller and the mechanical setting element are arranged in one single, compact unit of the device, it is possible to install the entire electronic device for preparing mixed water under the plaster. In addition, the compact and closed type of construction of the device permits dispensing with long cable installations that are susceptible to trouble. Furthermore, the electronic controller is optimally coordinated with the mechanical setting element.

A further surprising advantage can be achieved in that the preparation of the mixed water is completely controlled exclusively by means of one single temperature sensor. The omission of a diverse sensor system requiring considerable expenditure eliminates error sources and, furthermore, reduces costs required otherwise. This reduced sensor system can be compensated by ingeniously processing the measured values.

In an advantageous embodiment of the invention, provision is made for a stepping motor serving as the setting element. This stepping motor acts on a two-way mixing valve. Such an arrangement offers the benefit that the pre-specified control value is translated directly and clearly by means of the described setting element. This constitutes a distinct improvement vis-a-vis the elements comprising an expanding substance or bimetallic disks of the type usually employed for the preparation of mixed water. The setting elements mentioned last operate depending on the temperature, so that the behavior of the controller may change depending on the adjusted temperature.

A highly accurate temperature control would therefore always require the setting element to be monitored accordingly. This, however, is feasible only with substantial expenditure because of the behavior of the setting elements of the type specified above, which is highly dependent on the material employed for such elements and on the temperature.

The electronic device for preparing mixed water is advantageously connected with an interface module for connecting to it diagnostic and/or programming devices. The interface module may be used either for error diagnosis and purposes of parameterization, or for storing the required control programs. Furthermore, the interface module may permit a remote control of the electronic preparation of mixed water by means of a conductive connection or with the help of an infrared or radio control system. The device installed under the plaster may be supported via the interface module as well.

By providing a display unit serving as the operating unit, which comprises a display monitor in addition to an input unit, it is possible to take into account the fact that the electronic preparation of mixed water offers a whole series of additional possibilities and increased operating comfort.

In its simplest form, the display is a three-digit display, whereby each alphanumerical is preferentially designed in the form of a seven-segment display. This display is substantially used for displaying the nominal and/or the actual temperatures.

Furthermore, in its simplest form, the operating unit comprises a menu key as well as two selector keys.

The capacity of the electronic device for preparing mixed water readily permits supplying one single device of this type with a great number of water outlets for mixed water prepared accordingly. The CPU of the device for preparing mixed water can be used in this connection for controlling the selected mixed water outlet in a targeted manner.

Furthermore, the problem of the invention is solved by a method for preparing mixed water.

The entire process for the preparation of mixed water can be carried out in this connection by means of only one single temperature sensor by conducting a gradient evaluation of the determined temperature curve in addition to a detection of only the actual temperature value. The curve of the temperature gradient makes it possible to determine whether through-flow of water is taking place or not.

The method as defined by the invention thus permits an acquisition of the through-flow without employing for this purpose a suitable through-flow sensor.

In an advantageous, further developed implementation of the method as defined by the invention, tracking of the setting element is switched off as soon and as long as the gradient of the temperature curve drops and is falling short of a threshold value that can be preset. In the concrete realization of the method, this means that the temperature is controlled only when through-flow of water is in fact taking place.

By switching off the setting element, which preferably is a stepping motor, any unnecessary consumption of water as well as any premature wear of the components installed under the plaster are avoided. The mechanically driven components of the control valve would otherwise be constantly moved even when no water is flowing through.

Finally, in connection with the method as defined by the invention, it is possible to distinguish between at least two temperature control ranges with different control accuracy. This makes it possible to provide for fine control within the normally useful range. This range can be provided with a controlling accuracy of, for example down to one tenth or half a degree. Such controlling accuracy is not required outside of the normal useful range. This range has to be detected only because the external ambient conditions have to be determined, in particular the ambient temperature. However, in order to change from this rough control range to the fine control range, it is not necessary to operate the system with final accuracy. Also this distinction between rough and fine control represents a measure for prolonging the useful life of the system because unnecessary movements of the setting element can be avoided in this way.

This feature can be developed further by preventing the setting element from tracking outside of a defined temperature range as well. This, too represents a measure that is implemented for avoiding unnecessary wear and consumption of energy.

In another, further developed embodiment, the method as defined by the invention is used for evaluating the gradient of the temperature curve for the purpose of detecting excess temperatures and/or failure of the cold water feed. The detection of any excess temperature represents an important safety feature in the sphere of the private household in order to prevent scalding of the user. The same aim is served if it is detected in due time whether the feed of cold water possibly may be interrupted. Any failure of the feed of cold water will otherwise in the first instant lead to a discharge of overheated water as well, which absolutely needs to be prevented for safety reasons.

A further feature of the efficiency of the method as defined by the invention lies in the fact that the controller unit is conceived as a controller equipped with the feature of self-parameterization. When the system is started up for the first time, at least one limit of the control range is reached, and a histogram is recorded during the further operation with the help of successfully controlled temperatures. The system is accordingly self-adjusting and, most of all, self-learning because the histograms are continuously processed and up-dated as the system is in operation, and, moreover, become increasingly more accurate as the operating duration of the system is increasing.

Furthermore, the storage element associated with the controller can be advantageously used in such a way that the aforementioned range of fine control can be defined without problems in different ways. For example, a distinction can be made between individual user profiles. For example, the temperature range to be used for small children is different from the one set for adults.

This can be taken into account by filing corresponding user profiles in the above-mentioned memory element.

In another advantageous embodiment of the invention, the controller is connected to an operating data acquisition device. It is possible in this way to realize additional features pertaining to comfort, like an operating hour counter or presetting time periods for the use of water in the hotel and restaurant trades.

Finally, fixed control programs can be programmed and called off as well, such as, or example a program for thermal disinfection, by which an extremely high temperature is controlled for a defined length of time. Such a program is very valuable, for example for thermal disinfection for killing legionellae.

The invention is explained in greater detail in the following with the help of an exemplified embodiment shown only schematically in the drawing, in which.

Figure 1:
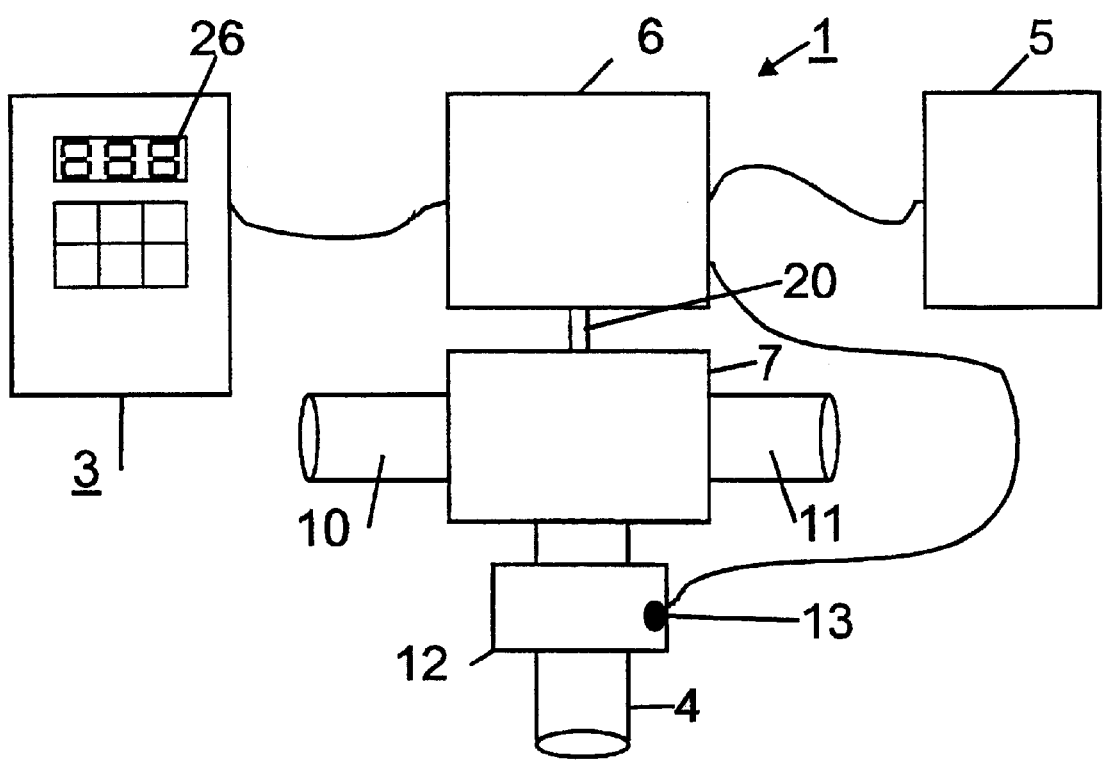
FIG. 1 is a basic representation of an electronic device for preparing mixed water shown by a block diagram.

FIG. 1 shows an electronic mixed water preparation device 1. The device 1 for preparing mixed water is substantially comprised of a compact device unit 2 that can be completely mounted under plaster. The unit 2 of the device is connected for data communication with an operating unit 3 or fitting for operating the device. The unit 3 is functionally communicating most of the time with a water outlet that is operated via the drain 4 of the device unit 2. Furthermore, the unit 2 of the device is connected to an interface module 5. The interface module 5 may be installed either spatially removed from the device unit 2, or it may be integrated in the device unit 2. In this connection, the interface module 5 is in any case installed in such a way that diagnostic and/or programming devices can be connected to the interface module 5 from the outside. For example, an RS 405 interface may be mounted on the plaster and be in data communication connection with the device unit 2. The device unit 2 is substantially comprised of an electronic controller 6 that contains a stepping motor in addition to the actual electronic controller. This stepping motor is connected via a transmission 20 with the actual mixer unit 7 and the control valve installed in the mixing unit 7. The mixer unit 7 is operating in a purely mechanical way and is substantially comprised of a mixer body 8 comprising a hot water inlet and a cold water inlet 10 and 11, respectively. The supplied hot and cold water is mixed within the mixer body 8 at the ratio preset by the electronic controller 6, and the nominal temperature preset via the operating unit 3 is ideally adjusted in this way.

The through-flow control 12, which needs no detailed explanation here, usually engages within the zone of the water outlet 4. Furthermore, a temperature sensor 13 for detecting the actual temperature, which reports the given actual value back to the controller unit 6, is arranged within the area of the through-flow control 12.

Figure 2:
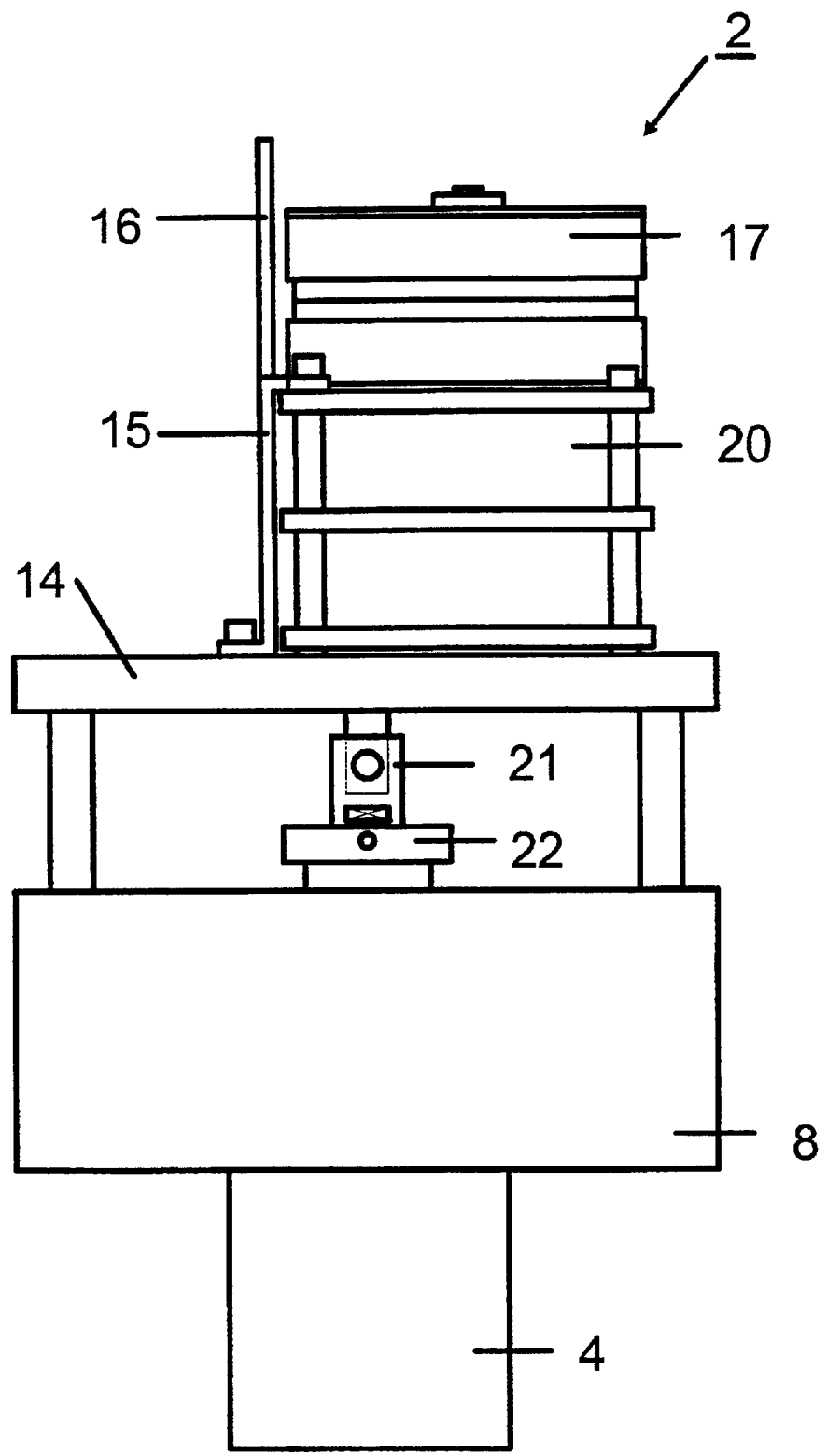
FIG. 2 is a cross section through a unit of the device for preparing mixed water.

The exact structure of the compact device unit 2 is shown in greater detail in FIG. 2. Within this device unit 2, a base plate 14 is screwed to an angled metal sheet 15. The angled metal sheet 15 furthermore supports a holding metal sheet 16 with a small plate that is substantially fitted with the components for building up the electronic controller unit 6. The electronic controller unit 6 is acting on a stepping motor 17 serving as the setting element. Via the transmission 20, the stepping motor is acting on a rotationally supported setting body 20. The hot or cold water 10 or 11, respectively, is opened to a greater or lesser extent depending on the rotational position of the setting body 21, and a water mixture corresponding with the given position of the setting body 21 is produced within the mixer body 8. The water mixture is flowing out via the outlet 4. The setting body 21 is sealed off versus the mixer body 8 by means of a gland nut 22.

The device unit 2 explained above, of course, also can be structured with some other geometric arrangement without changing its functionality. Important is only that a controller unit 6 is acting on a stepping motor 17, and that the latter is adjusting a setting body 21 via a transmission 20 in a defined manner. As opposed to the solutions comprising expanding substance elements or bimetallic elements conventionally employed, the given position of the transmission 20 represents a clearly defined and detectable quantity of the instantaneous position of the setting element and thus of the adjusted hot-and-cold-water mixture.

Figure 3:
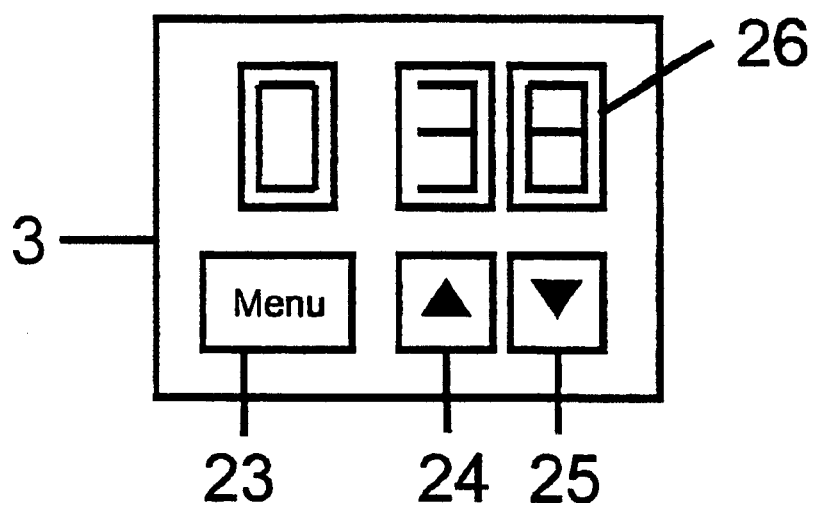
FIG. 3 shows an operating unit of the device for preparing mixed water.

The nominal values specified and to be transmitted to the setting element 21 via the controller unit 6 are input by means of the operating unit 3, which is shown in greater detail in FIG. 3.

In a particularly simple and advantageous embodiment, the operating unit 3 is comprised of a menu key 23 and the two selector keys 24 and 25, as well as of a three-digit alphanumerical display 26. This display is shown in the form of a three-digit display in the present case, whereby each individual alphanumerical symbol is realized in the form of a conventional seven-segment display.

Figure 4:
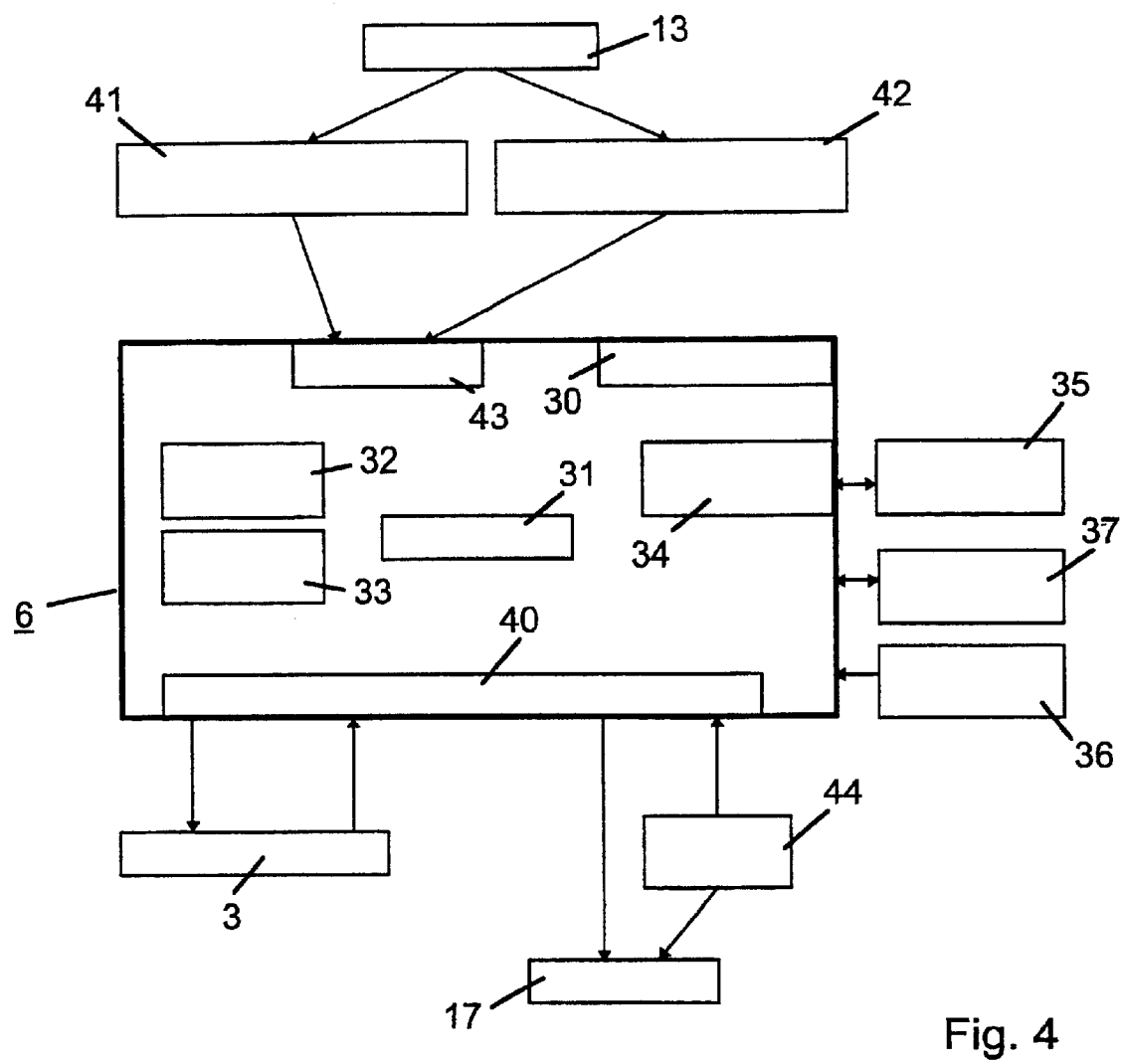
FIG. 4 is a block diagram of the controller unit with inputs and outputs.

The controller unit 6, which is arranged in the compact device unit 2, is shown in greater detail in FIG. 4. In addition to a micro-controller 30 with an integrated program memory 32, the controller unit 6 also comprises a data memory 33. Furthermore, the controller unit 6 is provided with a serial interface 34 for connecting the interface module 5. An interface driver 35 is associated with the serial interface 34. Furthermore, the controller unit 6 is connected for data communication with a reset controller 36 as well as an operating data memory 37. Finally, the controller unit 6 comprises the various digital inputs and outputs 40 for connecting the operating unit 3 and the stepping motor 17. The temperature sensor 13 is connected with the controller unit 6 via the different measuring amplifiers 41 and 42 and via an analog/digital converter 40, which is integrated in the micro-controller 30.

The different measuring amplifiers 41 and 42 are required in order to realize different control degrees of accuracy of distinguishable temperature ranges. For example, a temperature range outside of the usual temperature can be defined that is provided only with rough control. This temperature range, which is usually wider, can be provided with a measuring amplifier with lower resolution because the measured values as such exhibit greater differences there than in the temperature range provided with fine control.

Both programs and the data memory can be parameterized via the serial interface 34. The initial parameterization of the device takes place in this connection with the help of a program filed by the manufacturer in the program memory 32 of the micro-controller 30. According to this program, the entire control range is run through prior to the first start-up until the one end of the mechanical adjustment range of the setting body 21 that is marked by one of two corresponding limit switches, has been reached. The position corresponding with this one limit switch is secured in the data memory 33. The targeted end point of the control range will be the reference of "cold water only" in most cases.

In addition, while the device is in operation, each position of the setting element that the latter has reached for realizing a preset temperature, or the preset nominal values corresponding with that position, are filed in the data memory 33 in the form of a histogram that is continually changing and becoming more detailed.

The device 1 for preparing mixed water thus represents a self-learning and self-adapting system.

Figure 5:
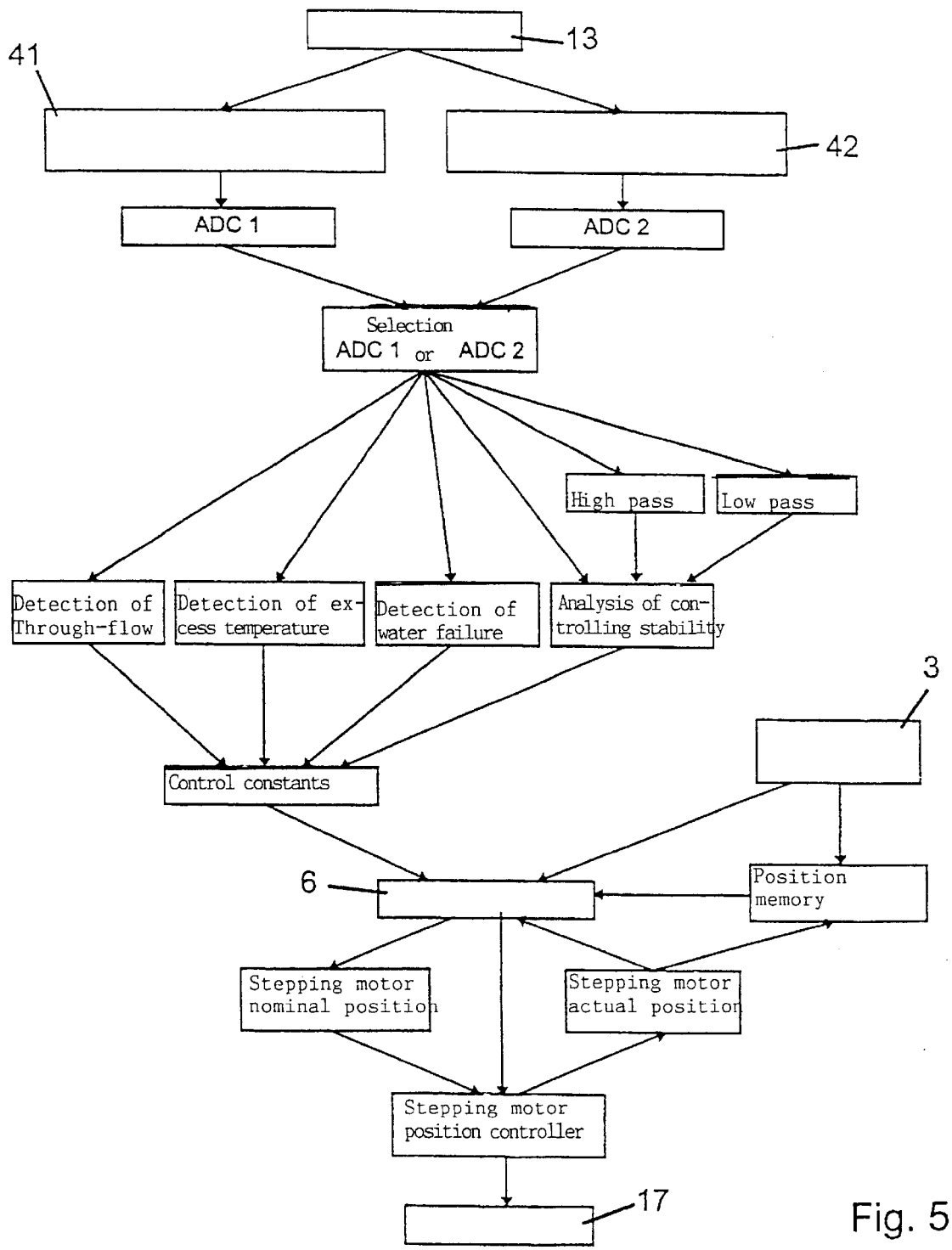
FIG. 5 is a flow diagram for controlling the temperature.

A conventional temperature control is shown in a flow diagram according to FIG. 5. There, the controller 6 is acting on the control valve via the stepping motor 17. A first secondary control circuit therefore consists in controlling the actual/nominal position of the stepping motor 17. The preset nominal temperature of the operating unit 3 is acting on this control circuit first. This superimposed control circuit receives an acknowledge message reporting the actual value via the temperature sensor 13 which, as stated earlier, acts on the first measuring amplifier 41 or the second measuring amplifier 42 depending on the determined temperature range. Depending on the quantity, the delayed measured value is supplied as the actual value to the controller unit 6 via a high- or low-pass filter for preserving the registration stability, whereby an attendant evaluation of the values transmitted by the temperature sensor 13 is used for detecting the throughflow, the excess temperature, or any water failure. In the event the gradient evaluation determines that one of these events has occurred, the controller is supplied with a constant nominal value, which drives the stepping motor 17 immediately into a position terminating the water supply.

Thus the above describes a method and a device for the electronic preparation of mixed water that permits preparing mixed water by means of a compact device unit 2 in association with an operating comfort not reached heretofore. High controlling speed combined with extremely low expenditure in terms of sensor equipment at the same time, is achieved by virtue of optimal coordination between the electronic control and the mechanical adjusting elements. The entire preparation of mixed water substantially can take place by means of only one single temperature sensor.

What is claimed is:

1. A method for preparing mixed water, in which a nominal value presettable via an operating unit (3) acts by means of a mechanical setting element (17) on a control line for preparing mixed water depending on an actual value detected by means of a temperature sensor (13), whereby the water supplied, the nominal temperature of which can be preset via the operating unit (3), is exclusively mixed by means of the temperature sensor (13) for detecting the actual value, characterized in that the gradient of the temperature curve detected by means of the temperature sensor (13) is additionally evaluated, so that a detection of the throughflow is possible; and whereby the tracking of the setting element (17) is switched off as soon and as long as the gradient of the temperature curve falls short at a presettable threshold value.

2. The method according to claim 1, characterized in that the control method distinguishes between to temperature control ranges having different control accuracies.

3. The method according to claim 2, characterized in that the tracking of the setting element (17) is switched off outside of a defined temperature range.

4. The method according to claim 1, characterized in that the evaluation of the gradient of the temperature curve is used for detecting an excess temperature and/or for detecting a water failure in such a manner that in the event the one and/or the other event are detected, the controller is supplied with a preset control constant in a manner such that the setting element (17) is driven into an end position interrupting the feed of water.

5. The method according to claim 1, characterized in that the controller unit (6) itself is designed as a self-parameterizing unit; that in a first step, a minimum and/or maximum point of the control range, preferably the feed of cold water is targeted, and the specified nominal value corresponding with this position of the setting element is filed in a data memory (33); and that in the further course of the operation, the positions of the setting element corresponding with the respective temperature setting are continuously filed in said data memory (33) in a histogram, the latter being continually up-dated in this way.

6. The method according to claim 5, characterized in that different temperature ranges of the fine control are on file in the data memory (33) of the controller unit (6).

7. The method according to claim 1, characterized in that the controller unit (6) is connected to an operating data acquisition.

8. The method according to claim 1, characterized in that a program module for thermal disinfection is filed in the program memory (32) of the controller unit (6) in such a manner that an extremely high, preset nominal temperature value is supplied to the controller for a defined length of time based on the value specified by the program.

9. The method according to claim 1, characterized in that a program module for thermal disinfection is filed in the program memory (32) of the controller unit (6) in such a way that the controller is provided for a defined period of time with an extremely high, preset nominal temperature value based on the value preset by the program.

* * * * *